United States Patent [19]

Olson, Sr. et al.

[11] 3,738,285
[45] June 12, 1973

[54] CONNECTIBLE RAIL-HIGHWAY VEHICLE

[75] Inventors: Buford W. Olson, Sr.; Eldrid Nelson; Albin A. Davidson, all of Minneapolis, Minn.

[73] Assignee: Chas. Olson & Sons, Incorporated, Minneapolis, Minn.

[22] Filed: Feb. 25, 1971

[21] Appl. No.: 118,790

[52] U.S. Cl. ............................ 105/215 C, 104/245
[51] Int. Cl...... B61d 15/00, B61f 9/00, B62d 61/12
[58] Field of Search ................. 104/242, 243, 245, 104/247; 105/215 C

[56] References Cited
UNITED STATES PATENTS

| | | | |
|---|---|---|---|
| 1,543,452 | 6/1925 | Spitz et al. | 105/215 C |
| 2,006,781 | 7/1935 | Winkley | 105/215 C |
| 2,030,311 | 2/1936 | Messick | 105/215 C |
| 2,088,522 | 7/1937 | Klima | 105/215 C |
| 2,110,230 | 3/1938 | Main | 105/215 C |
| 2,116,786 | 5/1938 | Gross | 105/215 C |
| 2,140,885 | 12/1938 | Soulis | 105/215 C |
| 2,482,564 | 9/1949 | Townsend | 105/215 C |
| 3,263,628 | 8/1966 | Grove et al. | 105/215 C |
| 3,638,581 | 2/1972 | Yard | 105/215 C |
| 3,653,332 | 4/1972 | Olson, Sr. et al. | 105/215 C |

Primary Examiner—Gerald M. Forlenza
Assistant Examiner—Howard Beltran
Attorney—H. Dale Palmatier

[57] ABSTRACT

Guide wheel assemblies mountable on a highway vehicle for movement between a retracted position and a rail travel position to guide the vehicle while the vehicle's flangeless wheels provide the driving power. Each assembly includes left and right guide wheels mounted for independent pivotal movement about a first axis and resiliently urged toward a datum position relative a subframe on which they are mounted, the subframe being mounted for pivotal movement on mounting members and overcenter lock mechanism for selectively moving the subframe to, and locking the subframe in a road travel position, and a rail travel position. The rear assembly includes an overcenter lock shaft mounted for limited vertical movement by the mounting members and cable mechanism connected to the vehicle rear spring mounted axle, extended over the shaft and mounted on the rear mounting members to permit the shaft to move upwardly and transmit a downward force through the lock mechanism and subframe to maintain a nearly constant pressure on the rear guide wheels in an overcenter lock position as the load on the vehicle box increases and moves the mounting members downwardly.

32 Claims, 14 Drawing Figures

CONNECTIBLE RAIL-HIGHWAY VEHICLE

BACKGROUND OF THE INVENTION

Guide wheel assemblies for highway vehicles that are used when the vehicle travels along railroad tracks to guide the vehicle along the tracks and the vehicle wheels provides the driving power. In U.S. Pat. No. 2,986,102 there is disclosed guide wheels mounted for limited independent movement about an axis spaced from the axis of rotation of the wheels. However, there is no suggestion of using overcenter lock mechanism, nor of load compensating mechanism for maintaining nearly constant downward pressure on guide wheels even though the load on the vehicle is varied.

In prior art highway vehicles drivable over rails where the vehicle wheels furnish the driving power and guide wheels are used, providing an increasing load on the vehicle results in a higher load being placed on the guide wheels and as a result less driving traction is available at the vehicle drive wheels. Thus proper downward pressure is not automatically maintained on the guide wheels with varying loads placed on the vehicle. In order to overcome problems such s the above as well as others, this invention has been made. Further this invention is directed to improvements over those disclosed in our copending application, Ser. No. 10,893, filed Feb. 12, 1970 now U.S. Pat. No. 3,653,332, issued Apr. 4, 1972.

SUMMARY OF THE INVENTION

Flanged guide wheel assemblies for a highway vehicle that include transverse guide wheels mounted on shafts which are pivotally mounted on a subframe and resiliently urged to given angular positions relative the subframe, the subframe being mounted for pivotal movement about an axis substantially spaced from said shafts and overcenter lock mechanism for moving the subframe and guide wheels between a raised highway travel position and a lowered, overcenter locked, rail travel position. The rear assembly also includes load compensating mechanism for maintaining nearly constant downward pressure on the guide wheels in a rail travel position even though the load on the rear portion of the vehicle is increased.

One of the objects of this invention is to provide new and novel guide wheel assemblies for a highway vehicle that are releasably retained in overcenter locked rail travel position and have guide wheels resiliently urged to given angular positions relative a subframe on which the wheels are mounted. In furtherance of the above object, it is another object of this invention to provide new and novel load compensating mechanism to act through overcenter lock mechanism in an overcenter locked, rail travel position for maintaining a nearly constant downward pressure on the guide wheels as the load on the vehicle is increased.

Figure 1:
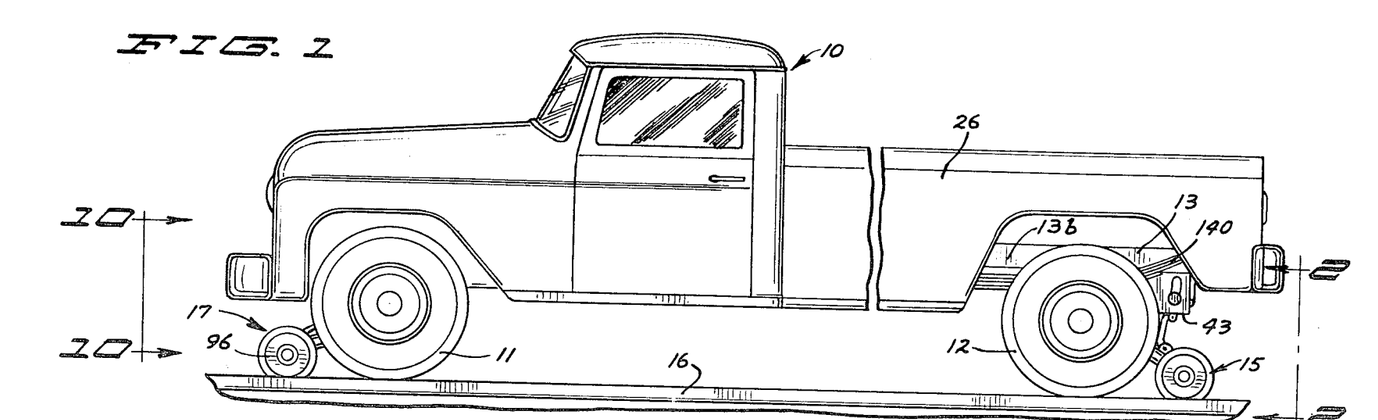
FIG. 1 is the side view of a vehicle having the front and rear guide wheel assemblies of this invention in positions to ride on railroad track rails, a central portion of the vehicle being broken away.
Figure 2:
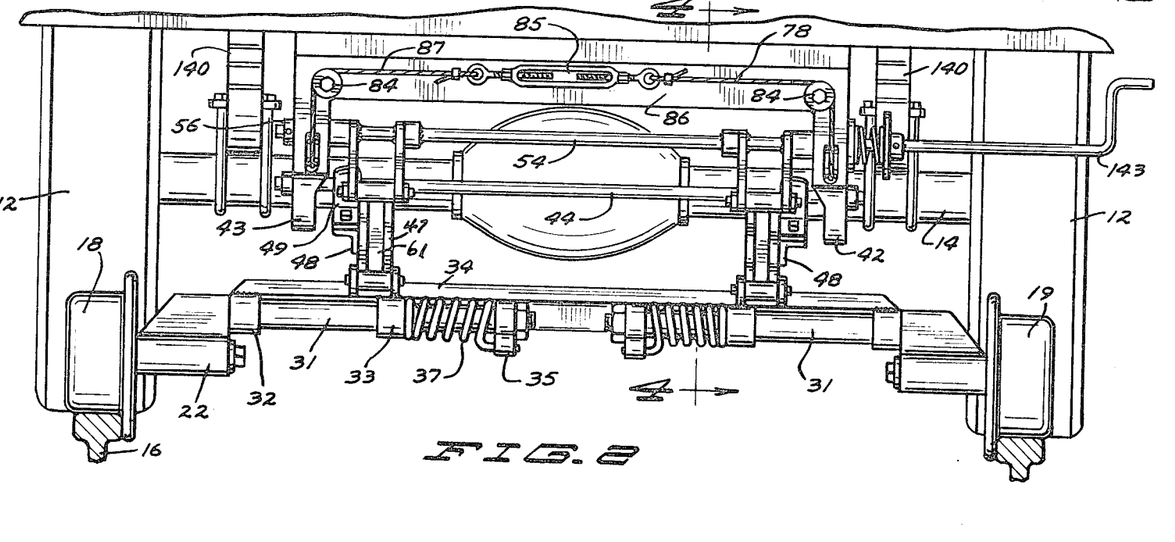
FIG. 2 is a fragmentary, rear end view of the vehicle and the rear guide wheel assembly in its rail travel position.

Referring in particular to FIGS. 1 and 2, the vehicle 10, which for purposes of illustrating the invention is shown as being a truck that has a frame 13, front flangeless wheels 11, a rear axle 14 dependingly mounted on the frame by conventional spring mechanism 140, rear flangeless wheels 12 mounted by the rear axle 14 and a box 26 in the frame 13. Mounted on the front and rear ends respectively of the frame of the vehicle are a front guide wheel assembly, generally designated 17, and a rear guide wheel assembly generally designated 15, assemblies 15 and 17 being shown in FIGS. 1 and 2 in their overcenter locked position for running on the rails 16 of the railroad track. The rear guide wheel assembly 15 includes flanged rail wheels 18 and 19, each of the rail wheels being rotatably mounted on one end portion of a transverse shaft 20 (See FIG. 8), the other end portion of each shaft being mounted in a nylon sleeve 21 which in turn is mounted in the aperture 23 formed in one end portion of the elongated arm 22. A reduced diameter bore 25 is formed in the arm to open to aperture 23, a nylon washer 24 being provided in aperture 23 to abut against the shoulder formed by apertures 25, 23. Washer 24 and sleeve 21 prevent shaft 20 from contacting arm 22. A bolt 30 has one end threaded into shaft 20 and a head end that abuts against a washer 29 that in turn abuts against a nylon washer 28. The nylon washer 28 abuts against the arm. Since aperture 25 is of substantially larger diameter than bolt 30, bolt 30 does not come into electrical contact with the arm 22. Flanged wheel 19 is mounted on a structure the same as members 20–25 and 28–30 other than said members are right hand members instead of left hand members.

The opposite end portion of the arm 22 for wheel 18 is keyed to the left hand end of an elongated transverse shaft 31 which in turn is rotatably mounted by transversely spaced bosses 32, 33. The bosses 32, 33 are mounted on the one end portion of a transverse channel 34 to extend outwardly from one side thereof. A torsion spring 37 is provided on shaft 31 and has one end retained in a fixed angular position relative channel 34 by boss 33 and an opposite end mounted by a mount 35 in a fixed angular relationship to said mount. The mount is keyed to the end portion of shaft 31 that is remote from arm 22, there being provided a nut on the threaded end portion of shaft 31 for retaining the mount on the shaft. The arm 22 for rail wheel 19 likewise is mounted by members 31–36 on the right hand end portion of channel 34. As a result of the aforementioned mounting, the right hand shaft 31 may pivot about a transverse axis independent of the left hand shaft 31 while at the same time shafts 31 are mounted for pivotal movement about a common transverse, horizontal axis. The axes of rotation of wheels 18, 19 are parallel to the pivotal axis of shafts 31 and equally radially spaced therefrom while the torsion springs resiliently urge the shafts 31 to datum positions that arms 22 extend angularly in nearly the same, if not the same, angular direction relative the axes of shafts 31.

Figure 3:
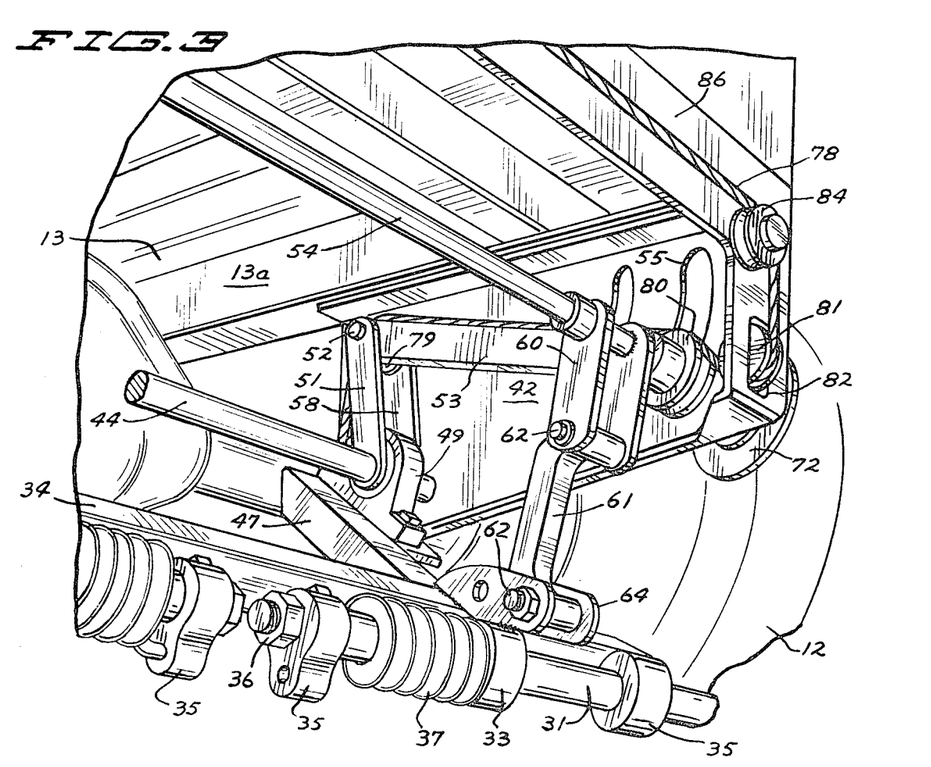
FIG. 3 is a fragmentary perspective view looking in an upward direction toward the right side of the vehicle to more fully illustrate the mounting of the rear guide wheel assembly and the overcenter lock mechanism in a locked rail travel position.
Figure 4:
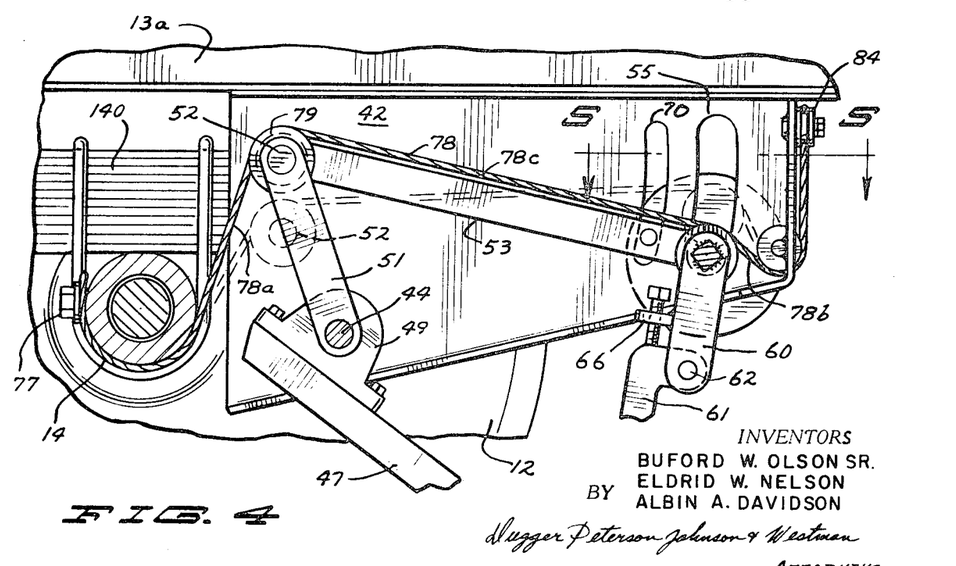
FIG. 4 is a fragmentary longitudinal cross sectional view generally taken along the line and in the direction of the arrows 4—4 of FIG. 2 with the rear guide wheel assembly in a rail travel position, the solid line position indicating no load on the vehicle and the dotted line position indicating a load on the vehicle.
Figures 8, 9, 10:
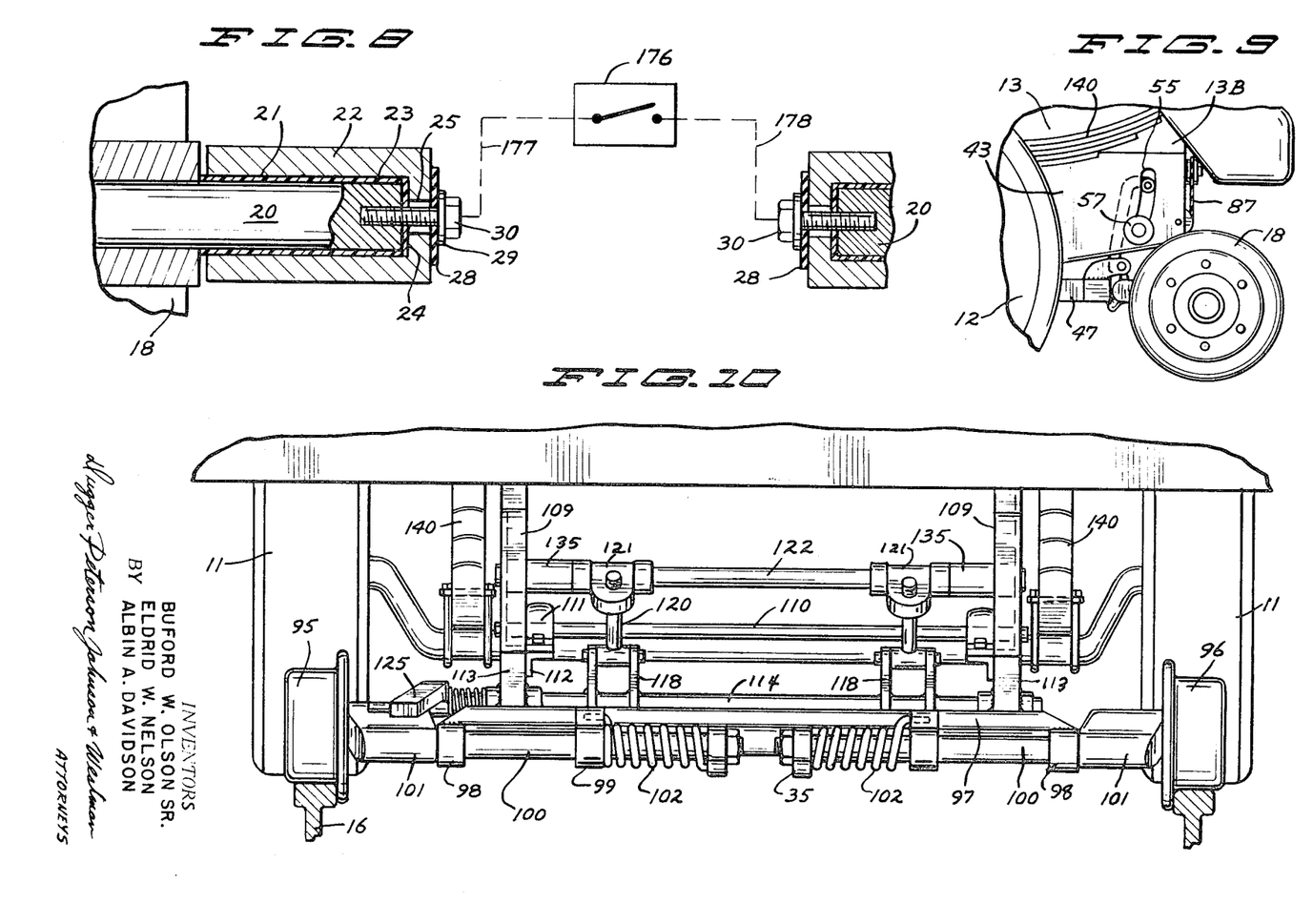
FIG. 8 is a fragmentary cross sectional view illustrating the mounting of the flange wheel axle, and schematically illustrating the switch for completing a circuit for tripping railroad signal lights.
FIG. 9 is a fragmentary side view illustrating the rear guide rail assembly in a road travel position.
FIG. 10 is a fragmentary front view generally taken along the line and in the direction of the arrows 10—10 of FIG. 1 to show the front guide wheel assembly in an overcenter locked, rail travel position.

Referring to FIGS. 3, 4 and 9, on the rear end portion of each of the vehicle longitudinally extending frame members 13a and 13b, there is respectively dependingly mounted mounting members 42 and 43. Mounting members 42 and 43 are of the same construction other than one is the left hand mounting member and the other is the right hand mounting member, and mounting member 42 has a slot 70. The mounting members are of generally trapzoidal construction with the lower front corner portion extending to a substantially lower elevation than the rear corner portion. Mounted by the lower front corner portions of the mounting members in fixed longitudinal and vertical elevations relative the mounting members is a transversed shaft 44 which is spaced rearwardly of and at about the same elevation as axle 14 when the box is unloaded.

The one end portions of the pair of arms 47 are fixedly connected to channel 34 in substantial transversed spaced relationship to one another, each opposite end portion of the arms 47 mounting an angle bracket 48 which in turn mounts a bearing member 49. The bearing members 49, through brackets 48, pivotally connect the arms 47 to the shaft 44, with the arms radially spaced from shaft 44, each of the bearing members being located between the one end portion of an arm 51 and the respective one of the mounting members 42, 43. The one end portion of each arm 51 is mounted on shaft 44, the opposite end portion of arm 51 and the adjacent reinforced land 58 of the adjacent mounting member mounting a pivot member 52 in a fixed vertical and longitudinal position relative the vehicle frame. On each pivot member 52 there is pivotally mounted the end of an elongated arm 53, the opposite ends of the arms 53 pivotally mounting a transverse shaft 54. The shaft 54 extends through the elongated, arcuate cam slots 55 in the rear portions of the mounting members 42, 43; the slots being curved about radii extending from the pivot axis of pivot members 52. The upper end portions of the slots are about the same elevation as the pivot members 52, the slots then extending downwardly and slightly forwardly. Retainers 56, 57 are mounted on the outer end portions of the shaft 54 for abutting against the mounting members to substantially eliminate transverse movement of the shaft.

The one end portions of a pair of overcenter lock arms 60 are keyed to the shaft 54 adjacent mounting member 42 while a corresponding pair of lock arms 60 are keyed to shaft 54 adjacent mounting member 43 to extend angularly therefrom in the same direction that the first pair of arms extend away from the shaft. The opposite ends of each pair of lock arms 60 has the one end of a lock arm 61 pivotally connected thereto by a pivot member 62. The opposite end of each lock arms 61 is pivotally connected by a pivot member 63 to the end portion of a clevised bracket 64 that extends into generally overhanging relationship to the respective shaft 31, each bracket 64 being welded to the channel 34 closely adjacent the respective arm 47. In this connection, noted that arms 47 and channel 34 form a rigid subframe and each arm extends away from channel 34 in the direction generally opposite from the location of the shafts 31 relative to the channel.

Figure 6:
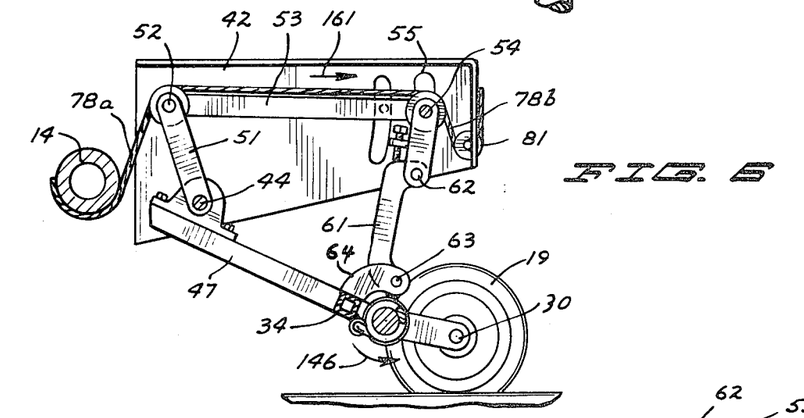
FIG. 6 is a fragmentary vertical cross sectional view generally corresponding to FIG. 4 other than for showing a vehicle in a heavily loaded condition, said view illustrating the rear overcenter lock mechanism in a rail travel position.
Figure 7:
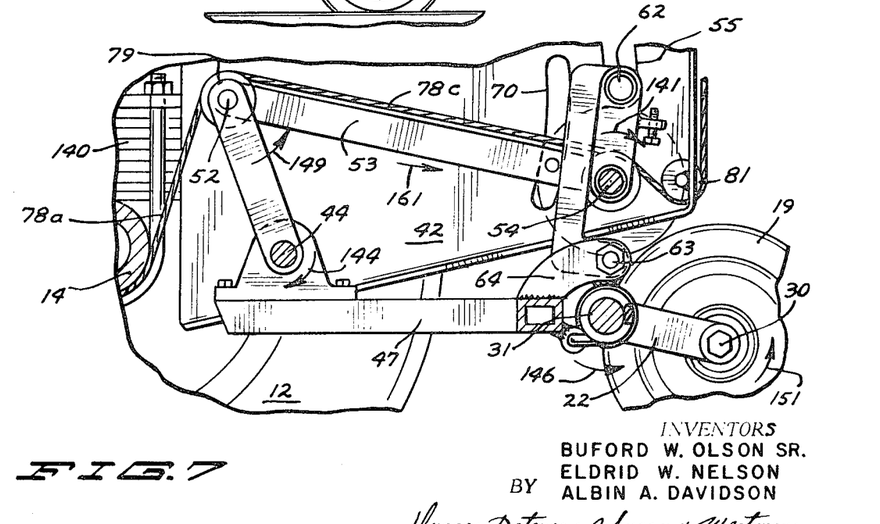
FIG. 7 is a vertical cross sectional view generally corresponding to FIG. 4 other than it shows the rear guide wheel assembly in a road travel position.

In order that the overcenter lock mechanism 60–63 may be moved between an overcenter locked, rail travel position and an overcenter locked, road travel position, lock arms 61 have elongated intermediate portions that are of greater lengths than the linear spacing of the opposed surfaces of shafts 54 and pivot members 62 and offset a substantial distance from a plane containing the pivot axes of pivot members 62, 63 whereby the pivot axis of shaft 54 is locatable to the right of the plane of the axes of members 62, 63 as viewed in FIG. 7. In the road travel position, lock arms 61 are abuttable against shaft 54 to limit the pivotal movement of arms 60 in a clockwise direction as viewed in FIGS. 3 and 7 while in the rail travel position, stop members 66 mounted by arms 60 abut against arms 61 to limit the pivotal movement of pivot members 62 in a clockwise direction about the pivot axes of pivot members 63 as viewed in FIGS. 3 and 6 while permitting movement of the pivot axes of pivot members 62 to the right of the plane of the pivot axes 54, 63 as viewed in FIG. 6.

Figure 5:
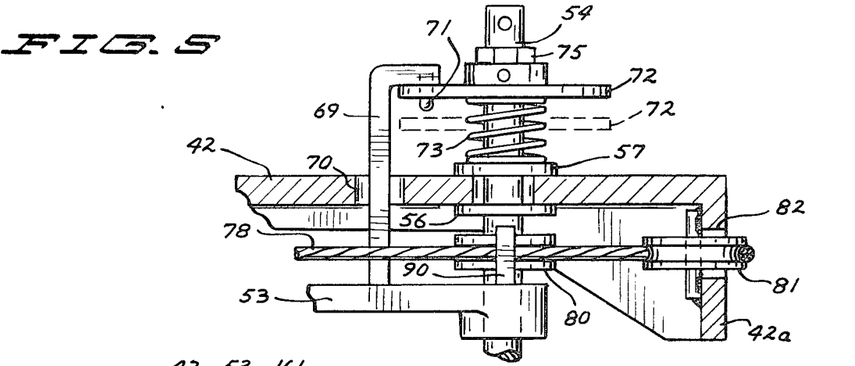
FIG. 5 is a fragmentary horizontal cross sectional view generally taken along the line and in the direction of the arrows 5—5 of FIG. 4 to illustrate the mechanism for aiding in the retention of the overcenter lock assembly in either of its rail travel or road travel position.

In order to prevent the overcenter lock mechanism accidentally moving out of the respective overcenter lock position, a generally L-shaped arm 69 has one end welded to the arm 53 adjacent mounting member 42, an intermediate portion extended through an arcuate slot 70 in frame member 42 and an opposite end portion mounting a stud 71 that extends transversely toward mounting member 42 (see FIG. 5). An annular member 72 is axially sideably mounted on the polygonal shaped end portion of shaft 54 but is not angularly moveable relative thereto, annular member 72 having one aperture for stud 71 to extend thereinto in the guide wheel overcenter locked, road travel position and a second aperture for the stud to extend thereinto in the guide wheel overcenter locked, rail travel position. A spring 73 is provided on shaft 54 to have one end abut against the adjacent retainer 57 and the opposite end abut against the annular member 72 for resiliently urging annular member axially outwardly of mounting member 42, there being provided a polygonal retainer 75 that is fixedly secured to shaft 54 for limiting axial outward movement of annular member 72.

An anchor member 77 is secured to the axle 14 adjacent and on the opposite side of the axle from mounting member 42, one end of cable 78 being attached to the anchor member (see FIG. 4). The cable then extends around the lower portion of the axle and then upwardly along run 78a to sheave 79, then over sheave 79 which is mounted on pivot member 52; thence along run 78c from sheave 79 to sheave 80, and over sheave 80 that is mounted on shaft 54 between arm 53 and frame member 42; thereafter downwardly along run 78b from sheave 80 to sheave 81, and then around the lower portion of sheave 81 that is mounted in a slot 82 in a transversed flange 42a of the mounting member 42 (see FIG. 5). Sheave 81 is fixed to flange 42a to move therewith. From sheave 81, the cable extends upwardly and over a sheave 84 that is mounted on the end portion of the transverse brace 86 that is connected to member portion 42a (see FIG. 3). The opposite end of the cable is connected to a turnbuckle 85 (see FIG. 2). Also connected to turnbuckle 85 is one end of the cable 87, the cable 87 extending over a sheave 84 that is mounted on the end portion of brace 86 that is connected to the transverse flange portion of mounting member 43. Cable 87 then extends over sheaves 81, 80, and 79 that are adjacent mounting member 43 and mounted in the same manner described with reference to the members that cable 78 extends over. The opposite end of the cable 87 is likewise connected to an anchor member 77 (not shown) that is mounted on the axle adjacent frame member 43. As may be noted in FIG. 5, a cable guide 90 is provided for retaining the cable closely adjacent sheave 80 even though there is slack in the cable, and to insure that when the slack is taken up in the cable, the cable will be directed back onto the sheave. Likewise, there are provided cable guides (not shown) for sheaves 79 and on the axle to aid in maintaining the cables in alignment with the respective sheaves 79, 80 to insure that the cables abut against the sheaves when any slack in the cables is taken up.

Referring to FIGS. 1 & 10–14, the front guide wheel assembly includes front rail flanged wheels 95 and 96. The wheels, 95, 96 are mounted on the front channel 97 by bosses 98, 99, shafts 100, arms 101, and torsion springs 102 in the same manner that the rear flanged wheels are mounted on channel 34 other than the datum direction of extension of arms 101 relative the channel 97. The rail wheels 95, 96 are mounted on arms 101 in the manner indicated in FIG. 8 for the rear flanged wheels being mounted on arm 22. Mounted on each of the front end portions of the longitudinally extending frame members of the vehicle frame 13 in a fixed position relative the respective frame member is a depending mounting member 109. Mounted by the mounting members 109 in fixed positions relative the mounting members are the opposite end portions of a transverse shaft 110 which is located forwardly and at a somewhat lower elevation than the axis of rotation of the wheels 11 when the wheels 11 are in a straight ahead travel position. Bearing members 111 are mounted on shaft 110 to in turn mount angle brackets 112 for movement about the shaft 110 with the angle brackets in radial spaced relationship to the shaft. Each angle bracket is attached to the one end portion of an elongated arm 113, the forward end portions of arms 113 being welded to the channel 97 on the opposite side thereof from bosses 98, 99. The forward end portions of these arms (adjacent channel 97) pivotally mount a transverse shaft 114, the shaft being extended through appropriate apertures provided in said arms. It is to be noted that the shape of the mounting members 109 is such that the arms 113 may move relative shaft 110 between an elevated road carry and the lowered rail travel position such as will be more fully set forth thereafter.

Welded to shaft 114 adjacent each end portion are the one ends of the respective pair of lock arms 118, the lock arms extending outwardly from the shaft in the same angular direction. The opposite ends of each pair of lock arms 118 mounts a transverse pivot member 119 which in turn pivotally mounts the one end of the bent lock arm 120. A transverse shaft 122 has its opposite end portion pivotally mounted transversely spaced bearing members 135 that in turn are mounted by the mounting members 109 such that the shaft 122 is retained at a fixed spacing from shaft 110 and at a higher elevation and forwardly of shaft 110. Keyed to the shaft 122 adjacent each of the mounting members 109 is a mounting member 121 which in turn mounts the opposite end portion of the respective lock arm 120 whereby the lock arms 120 are retained in a fixed position relative shaft 122. The relative lengths and shapes of lock arms 118, 120 are such that in a rail travel position, the central axes of pivots 119 are forwardly of the transverse plane of pivot axes shafts 114 and 122 with the central axes of pivots 119 being vertically intermediate the axis of shaft 122 and the axis of shaft 114; and in a road travel position, the pivot axes of pivot members 119 are at a lower elevation than the pivot axes of shafts 114, 122, the pivot axis of shaft 122 at a higher elevation than shaft 114, and the pivot axis of shaft 114 located slightly rearwardly of a plane containing the central axes of pivot members 119 and shaft 122. An adjustable stop 123 is welded to channel 97 to limit the pivotally movement of arms 118 in the direction opposite arrow 131 (see FIGS. 12–14).

Mounted to the right hand end portion of channel 97 to extend away therefrom in the same direction as arms 113 is a block 124, the right hand end of shaft 114 being mounted for rotation by said block. At least the part of the shaft 114 transversely intermediate block 124 and adjacent arm 113 is polyganol in cross sections, crank portion 125a of the crank arm 125 being mounted on said polyganol part of the shaft for axial movement relative thereto, but not being angularly movable relative thereto. The crank arm has a second elongated, diagonally extending portion 125b that has one end joined to part 125a at a substantial radial distance from shaft 114 and an opposite end joined to a polyganol part 125c on which a crank is mountable for turning the crank arm. A plate 126 is joining to portion 125b to overlay and abut against block 124 when the crank arm is in the overcenter locked, rail travel position illustrated in FIGS. 12 and 14, one edge of plate 126 abutting against a surface of plate 127 that is secured to the opposite side of the block 124 from channel 97 and extending both to a higher elevation and to a lower elevation then the surface of the block 124 to which it is secured. Plate 126 in abutting against plate 127 and block 124 prevents the crank arm from being rotated relative the block 124; however, upon the crank arm being moved axially toward arm 113 to a position that plate 126 does not bear against block 124 and plate 127, the crank arm may be rotated relative to block 124. A coil spring 130 is provided on shaft 114 to have one end abut against part 125a and an opposite end abut against arm 113 for resiliently retaining part 125a in abutting relationship on block 124 and thereby plate 126 in a position to prevent the crank arm from being accidently rotated. It is to be noted that when the crank arm has been moved axially toward arm 113 and is rotated in the direction of the arrow 131 relative the axis of shaft 114 through an angle of about 180°; thence the crank arm 125 may be moved axially and is resiliently urged axially away from arm 113 to the position that plate 126 bears against the generally bottom surface of block 124 and has one edge abutting against the adjacent surface of plate 127 to prevent the crank arm from being rotated in either direction. Through the provision of block 124, and plates 126, 127, shaft 114 is blocked from accidental rotation out of either of the overcenter locked, rail travel or road position.

When using the guide wheel members of this invention in a rail travel position, the guide wheels carry a substantial part of the weight of the vehicle. However, the bulk of the weight is carried by the vehicle wheels. It is important that sufficient weight is carried by the vehicle wheels in order to maintain the desired frictional contact for both traction and braking operations which is obtained through the engagement of the vehicle wheels with the rails. At the same time, the guide wheels carry sufficient weight in order to maintain the vehicle relative the track that the wheels of the vehicle ride on the tracks and guide the vehicle around the curves. Additionally, it is important to maintain the proper weight on the vehicle wheels and the guide wheels regardless of whether or not the vehicle is in a loaded or an unloaded condition. As may be noted relative the vehicle of this invention, the rear axle is mounted on springs 140 which in turn are secured to the vehicle frame. Thus, with the guide wheels in an elevated position, as an increasing load is loaded onto the truck box of the vehicle, the box and the rear portion of the frame moved downwardly to be more adjacent ground elevation. However, as will be described hereinafter, the pressure exerted by the rear guide wheels on the rails in a rail travel position is maintained nearly the same in both the vehicle loaded and a vehicle unloaded condition.

Figure 11:
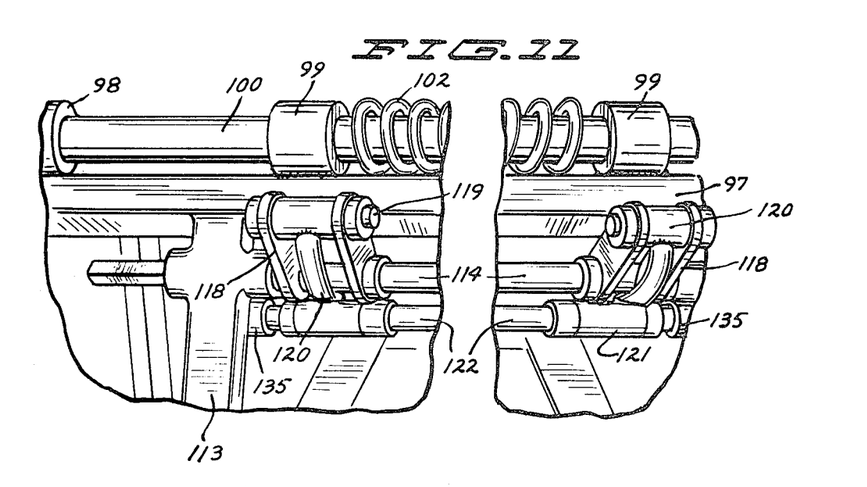
FIG. 11 is a fragmentary, bottom, generally isometric view illustrating parts of the front guide wheel assembly in an overcenter locked, road travel position.
Figure 12:
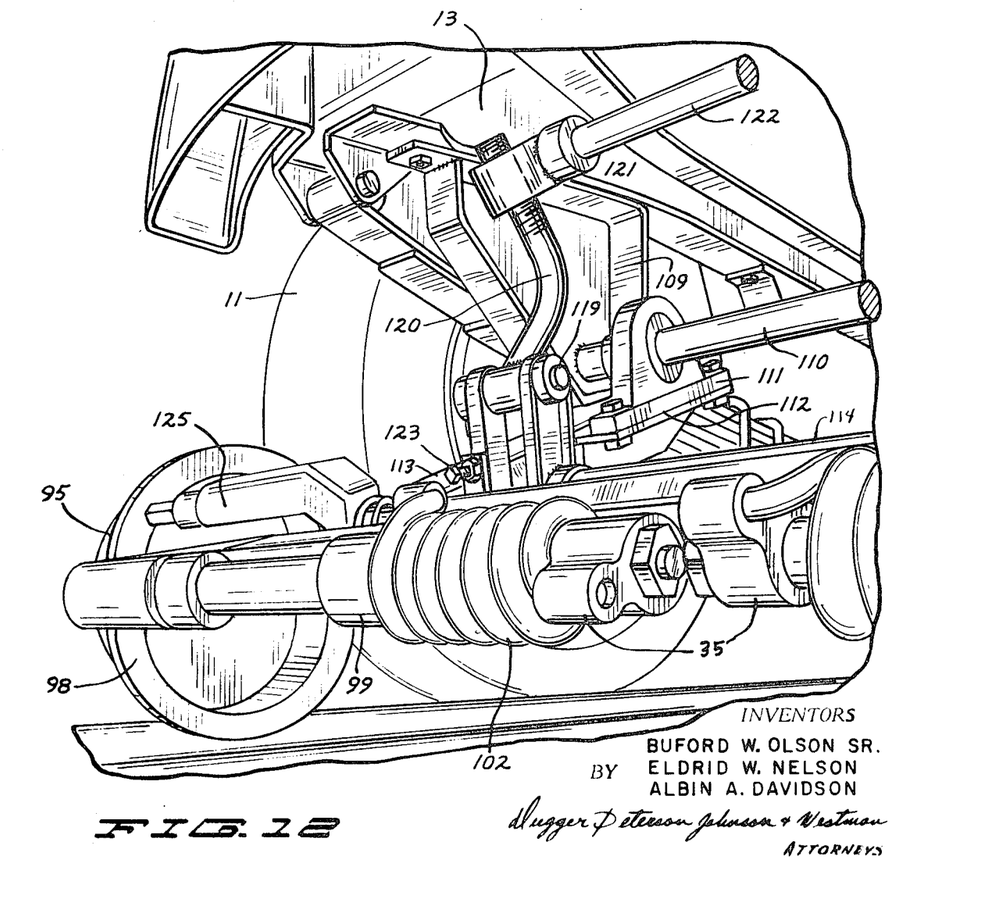
FIG. 12 is a fragmentary, perspective view looking upwardly toward the right hand side of the vehicle with the guide wheel assembly in an overcenter locked, rail travel position.
Figure 13:
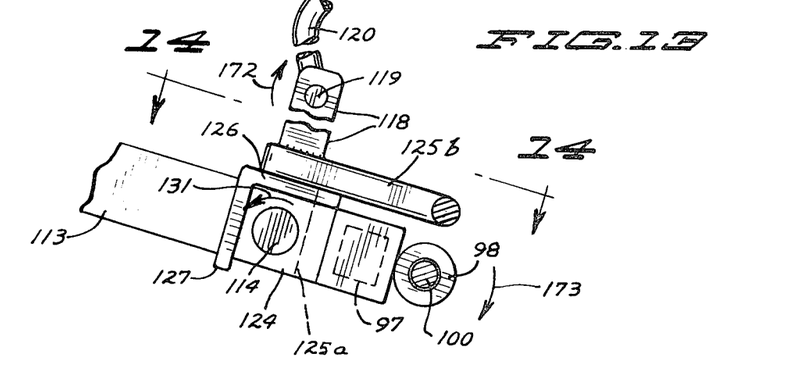
FIG. 13 is a fragmentary, vertical cross sectional view illustrating the mounting of the crank mechanism for moving the overcenter lock mechanism between the rail travel and the road travel positions, said view being generally taken along the line and in the direction of arrows 13—13 of FIG. 14.

When the vehicle is travelling over the highway, the front guide wheel assembly is in the FIG. 11 position while the rear guide wheel assembly is in the position illustrated in FIGS. 7 & 9. At this time, none of the weight of the vehicle is being carried by either the front or rear guide wheels. Further, the weight of the rear guide wheels is primarily being supported by shafts 44, 54 while due to the relative location of the pivot axes of members 54, 62 and 63, the weight of the rear guide wheels that is supported by pivot members 63 results in lock arms 60 being urged to pivot in the direction of arrow 141 to a further overcenter locked position. However, lock arms 61 in abutting against shaft 54 prevents further pivotal movement in the above mentioned direction from the position illustrated in FIG. 7. At this time the load supported by shaft 54 is supported by the edge portions of frame members 42, 43 that define the bottomed edge of slots 55, the shaft bearing against said edge portions. Further at this time cables 78, 87 are in a slack condition.

When its desired to lower the rail guide wheel assembly to a rail travel position, a crank 143 is positioned on the end of the shaft 54 adjacent mounting member 42, then moved transversely inwardly toward said mounting member to push the plate 72 to its dotted line position of FIG. 5 and thence the crank rotated to pivot shaft 54 in the direction opposite arrow 141. The initial turning movement of the crank results in members 62 being slightly elevated, and thence pivot members 62 moved progressively to lower positions. As pivot members 62 are moved to lower elevations, arms 47 and bearing members 49 swing above shaft 44 in the direction of arrow 144. As a result, shafts 31 move forwardly and predominantly downwardly.

It is to be noted, at the time the rear guide wheel assembly is in the road travel overcenter locked position, arms 22 extend predominently rearwardly and somewhat downwardly relatively to shafts 31 whereby the center axis of shafts 20 are of a somewhat lower elevation than the center axes of shafts 31. The angular positions of the arms 22 relative shafts 31 are resiliently retained in the aforementioned condition due to the spring characteristics of the torsion springs 37 which at their one ends are retained in fixed angular positions by bosses 33.

When the crank has been sufficiently rotated in the direction opposite of arrow 141 that lock arms 60 extend predominently downwardly from shaft 54, shafts 31 have been moved to an elevation that the rail wheels 18, 19 contact the rails. At this time further rotation of the crank in the direction opposite arrow 141, through lock arms 60, 61, results in a downward pressure being exerted pivot members 63 to move shafts 31 further downwardly. This downward motion of shafts 31 initially results in the springs 37 being wound to a neutral condition and thereafter due to shafts 20 now being maintained at a fixed elevation, arms 22 pivot the shafts 31 in the direction of the arrow 146 relative the bosses 33, 35 to more tightly wind the torsion springs.

In a no load condition on the box and with the pivot axes of members 62 being moved in the direction opposite arrow 141 across the plane of the pivot axes of members 54, 63 to the rail travel overcenter lock condition, the strength or spring characteristics of the torsion springs are such that the downward motion of pivot members of 63 is opposed sufficiently that shaft 54 is elevated from the bottom edges of slots 55 to take up any slack in cables 78, 87; the stops 66 in abutting against arms 61 limiting the pivotal movement of lock arms 60 in a direction opposite arrow 141. The shaft 54 in moving upwardly has a part of the weight of the vehicle transfered thereto through the cables to resist further upward movement of the shaft relative the mounting members.

For purposes of facilitating the understanding of the invention, it now will be assumed that an increasingly heavier load is loaded in the truck box with the overcenter lock mechanism of the rear assembly in the rail travel position. As the load is increased, due to the resilient characteristics of the vehicle springs 140, the rear portion of the longitudinal frame members 13a, 13b move to progressively lower elevations and move downwardly relative the rear axle. This downward movement results in the frame members 42, 43 moving generally downwardly the same amount as the rear portion of the vehicle; and accordingly the shaft 44 and pivot members 52 move generally downwardly. As pivot members 52 move downwardly, the minimum spacing between the axle 14 and the sheaves 79 decreases, and the minimum spacing between sheaves 80 and 81 increases. That is, the length of the cable run 78a between the axle and sheave 79 progressively decreases as the load on the vehicle box increases. Further, since the action of springs 37 now urge shafts 31 to rotate relative channel 34 in the direction opposite arrow 146 relative axis of the shaft 31; and shaft 44 in being lowered swings arms 47 relative to shaft 44 in a direction opposite arrow 144 and arms 44 relative the shafts 31 in the direction of arrow 146 which decreases the spring tension in springs 37, the torsion springs are (or tend to be) unwound slightly and pivot members 63 moved angularly to slightly higher elevations. This unwinding of the torsion springs allow the shafts 31 to lower slightly which results in the shafts 31 being moved angularly in a direction to wind the torsion springs slightly (arms 22 in being keyed to shafts 31 pivoting relative shafts 20 in the direction of arrow 151). The above results in shafts 31 being maintained in a nearly constant position; i.e., moves downwardly very slightly as an increasing load is placed on the vehicle. Further, the combination of the load on the shafts 31 and the springs 37 resiliently urging the arms 22 to pivot in the direction opposite arrow 146, the downward pressure of the rail wheels on the rails remains substantially constant even though the increasing load on the box results in the mounting members moving downwardly a substantial distance relative the rails.

In connection with the above, since the lock arms are in an overcenter locked, rail travel position and shafts 31 are maintained at a nearly constant elevation, shaft 54 is maintained at a nearly constant elevation as the load on the vehicle increases. Thus, as the mounting members more downwardly, arms 53 pivot relative shaft 54 in the direction opposite arrow 141 and maintain pivot members 52 in the same radial spaced relationship to shaft 54. Since as the mounting members move downwardly, arms 47 and 53 pivot relative members 44 and 52 respectively in counterclockwise directions as viewed in FIG. 6, pivot members 54, 62, 63 are maintained in overcenter locked relationship, pivot members 63 at this time being moved to slightly higher elevations relative shafts 31. Also, the torsion spring acting to pivot arms 22 relative shafts 30 in the direction opposite arrows 151, urges shafts 31 upwardly which aids in retaining the lock arms in an overcenter locked, rail travel position.

The above movement of the mounting members downwardly from the position shaft 54 bottoms on slots 55 takes up any slack in cables 78, 87; and as the load increases, some of the weight on the box is transferred through sheaves 81 to the cables to move cable run portion 78 (and corresponding portion of cable 87) intermediate sheaves 79, 80 in the direction of arrow 161 and exerts a downwardly directed force at sheaves 80. Accordingly, as the length of run 78a decrease, the length of run 78b increases, and the resilient urging of the torsion springs tending to elevate shafts 31 in the rail travel overcenter locked position is opposed by the downward force on sheaves 80.

Through the provision of cables 78, 87 the overcenter lock mechanism, the subframe, shaft 54 and arms 53, even though the elevation of the mounting members varies relative the rails (due to, for example, the vehicle wheels going over) relatively short length dips; or variations of the load on the vehicle box), the variations in the downward force holding the rear guide wheels on the rails is minimized, and retained nearly constant even with variations in the load on the vehicle box.

Figure 14:
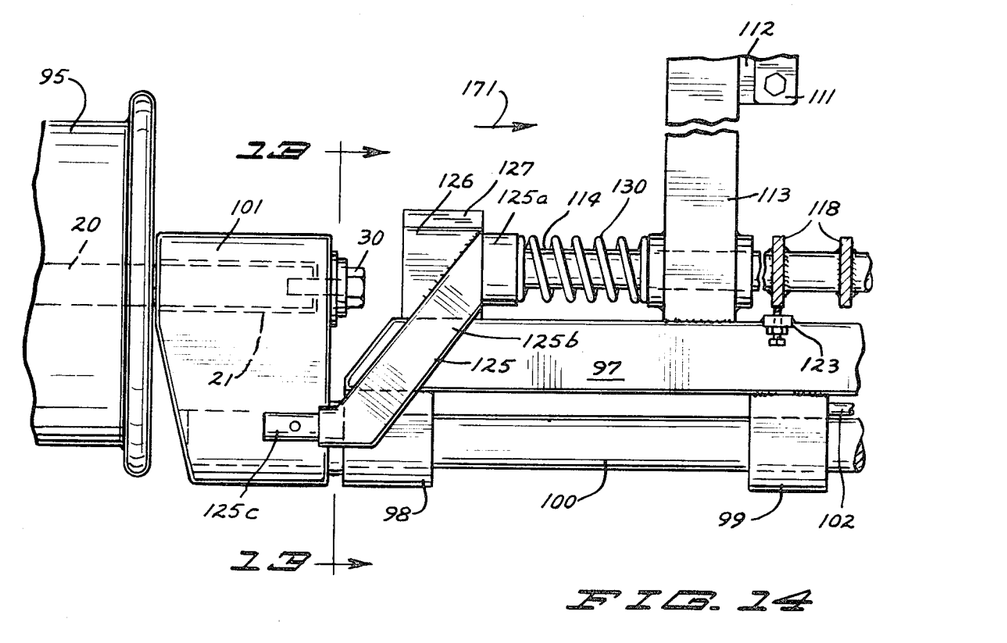
FIG. 14 is a fragmentary view generally taken along the line and in the direction of the arrows 14—14 of FIG. 13 to more clearly illustrate the mounting of a flange wheel on the front guide wheel assembly frame with the front guide wheel assembly in an overcenter locked, rail travel position.

With reference to the front guide wheel assembly, a crank, not shown is positioned on crank arm portion 125c and thence moved axially in the direction of arm 171 to move plate 126 to the left of plate 127 as viewed in FIG. 14 (plate 126 in the road travel position being beneath block 124) and thence operated to rotate shaft 114 relative arms 113 in the direction opposite arrow 131. This causes arms 118 to rotate about pivots 119 relative arms 120 to move shaft 114 through positions further forwardly relative arms 120 to first move forwardly of the plane of the pivot axes of members 122, 119 and to move downwardly relative shaft 122. Due to shaft 114 being mounted by arms 113, as arms 118 approach a horizontal condition pivot members 119 move rearwardly and thence move forwardly as arms 118 pivot from adjacent their horizontal condition to their positions extending generally downwardly relative pivots 119. Upon the guide wheels 95, 96 contacting the rails and further operation of the crank as above mentioned, first the arms 101 pivot shafts 100 in the direction of arrow 173 that winds springs 102 to a neutral spring condition and thence further wind the springs to resiliently urge the shafts 100 to rotate in a direction opposite arrow 173 which resiliently urges the shafts 100 to move upwardly, arms 101 extending predominantly rearwardly of shafts 100 in both a rail travel and a road travel position. Accordingly with the front guide wheels abutting against the rails, prior to and after the front guide wheel assembly is moved to an overcenter locked, rail travel position, through the action of the torsion springs urging shafts 100 to move upwardly, arms 113 are resiliently urged to swing about shaft 100 in a generally clockwise direction as viewed in FIG. 12 which aids in maintaining the front guide wheel assembly in an overcenter locked rail travel position.

After shaft 114 has been rotated to the rail travel overcenter locked position, the crank is removed and spring 130 moves the crank arm axially to the position illustrated in FIG. 14, which prevents shaft 114 from rotating.

By having arms 101 extend generally rearwardly of shafts 100, the front guide wheels in a rail travel position are located closely adjacent the vehicle front wheels which improves the guiding action and minimizes wear on the vehicle front wheels. No load compensating mechanism has been provided for the front guide wheel assembly since on a truck most of the load placed on the vehicle is on the rear part of the vehicle.

The mounting of shafts 20 described with reference to FIG. 8 has been provided so that as the vehicle moves down the rails, railroad signal lights are not tripped. However, if it is desired to trip the signal lights, this may be accomplished by moving the manually operated switch 176 to a closed position, switch 176 being electrically connected through lines 177, 178 to the bolts 30 of flange guide wheels on opposite sides of the vehicle to establish an electrical circuit from one rail to the other. Advantageously switch 176 is located in the cab of the vehicle.

What is claimed is:

1. In combination with a highway vehicle having a longitudinally elongated body frame and flangeless front and rear wheels mounted on the front and rear portions respectively of the body frame, a front and a rear guide wheel assembly mounted on the front and rear portions respectively of the body frame, at least one of said guide wheel assemblies including transversely spaced left and right flanged guide wheels, a first transverse pivot member, mounting means mounted on one of said body portions for mounting the first pivot member, a subframe means, first means for connecting the subframe means to the first pivot member for swinging movement about the axis of the first pivot member, a right and a left transverse shaft pivotally mounted on the subframe means in substantial radial spaced relationship to the first pivot member, a right and a left arm each having one end portion keyed to the right and left shaft respectively and an opposite end portion, a first and a second transverse shaft mounted by the right and left arm opposite end portion respectively for rotatably mounting the respective right and left guide wheel, torsion spring means connected to the right and left shafts for resiliently urging the right and left shafts to given angular positions relative to the subframe means, and lock means mounted on the mounting means and connected to the subframe means in substantial radial spaced relationship to the first pivot member for moving the subframe means about the first pivot member axis between a guide wheel road travel position and a rail travel position and selectively releasably retaining the subframe means in a locked condition in each of said positions.

2. The apparatus of claim 1 further characterized in that said lock means includes a third transverse shaft rotatably mounted by the mounting means, a first lock arm having a first end portion mounted on the third shaft in fixed angular relationship thereto, and a second end portion, a second lock arm having a first end portion and a second end portion, pivot means connecting said lock arms second end portions for pivotally movement relative one another about a transverse axis and a fourth shaft pivotally mounted by the subframe means in fixed relationship thereto, said second arm first end portion being mounted on the fourth shaft in fixed angular relationship thereto.

3. The apparatus of claim 2 further characterized in that the third shaft is mounted by the mounting means at a substantially higher elevation than the first pivot member and in a substantially stationary vertical position relative the mounting means, and that there is provided means on the fourth shaft that is adapted to have a crank mounted thereon for pivoting the fourth shaft.

4. The apparatus of claim 2 further characterized in that the mounting means comprises a pair of transversely spaced mounting members, each having a generally vertically elongated slots, said third shaft being extended through the slots and vertically movably therein within the limits of the lengths of said slots.

5. The apparatus of claim 1 further characterized in that the lock means comprises overcenter lock means that includes a first and a second lock arm, said lock arms each having a first end and a second end, a transverse pivot member pivotally connecting the arms first ends, second means for connecting the first arm second end to the subframe means for pivotal movement relative the subframe means about a transverse axis, and third means mounting the second lock arm second end on the mounting means for pivotal movement about a transverse axis.

6. The apparatus of claim 5 further characterized in that one of the lock arms has an intermediate portion substantially offset from its first and second ends and is of a substantially greater length than the other lock arm.

7. The apparatus of claim 5 wherein the vehicle has a rear axle that mounts the rear wheels and spring means for mounting the rear axle on the body rear frame portion and permitting lowering of the body rear portion as the vehicle is loaded, further characterized in that there is provided elongated third arms having one end portions mounted on the lock means and opposite end portions, said lock means being vertically movable relative the mounting means, transverse fourth means for pivotally connecting the elongated third arms opposite end portions to the mounting means in substantial spaced relationship to the first pivot member and the right and left transverse shafts, and means for transmitting a load from the vehicle through the lock means to the overcenter lock means as the load on the vehicle increases while allowing the mounting means moving downwardly relative the overcenter lock means when the lock means is in a subframe overcenter locked, rail travel position.

8. The apparatus of claim 5 further characterized in that the second means comprises a transverse lock member shaft having the first lock arm fixedly attached thereto.

9. The apparatus of claim 8 further characterized in that a stop member is mounted on the subframe means, and that there is provided a crank member having one end portion axially slidably movable on the lock member shaft, said lock member shaft and crank member having cooperating means to selectively retain said lock member shaft and crank member in substantially the same relative angular positions, means for resiliently urging the crank member toward said stop member to a datum position, said crank member having a portion that in a crank member datum position abuts against the stop member to block angular movement of the crank member about the lock member shaft axis and that clears the stop member when the crank member is moved axially away from the stop member.

10. A guide wheel assembly for directing the support wheels of a vehicle along railroad tracks and accommodating vertical displacement of the vehicle frame and body relative to the support wheel axle as the vehicle springs flex under various load conditions, comprising:
mounting means attachable to the vehicle frame adjacent the axle,
a pair of flanged guide wheels to roll along the tracks, subframe means mounting said guide wheels and connected to said mounting means and restrained thereby from significant horizontal movement while permitting relative vertical movement between the mounting means and the guide wheel-carrying subframe means, a taut cable with spaced portions anchored to the axle and the mounting means, and pulleys underlying the cable between the anchored spaced portions and respectively mounted on the subframe means and the mounting means, the cable extending generally horizontally between said pulleys and bearing downwardly to urge the flanged guide wheels against the tracks, and the subframe means incorporating relatively movable parts to accommodate slight relative vertical movement between the guide wheels and the cable, and spring means bearing against said parts and restraining said parts against such relative movement.

11. The guide wheel assembly according to claim 10 and said cable extending in a generally upright direction from each of said pulleys to a respective spaced portion of the cable at which the cable is anchored.

12. The guide wheel assembly according to claim 10 and said pulleys being arranged to guide the cable from the pulley on the subframe means to the pulley supported by the mounting means and thence to the portion anchored to the axle.

13. The guide wheel assembly according to claim 10 wherein adjacent portions of the cable extending away from each of said pulleys extend at oblique obtuse angles relative to each other, one of said obtuse angles increasing and the other of the obtuse angles decreasing as the vehicle frame and mounting means is displaced in one direction during a change of load conditions.

14. The guide wheel assembly according to claim 10 and said cable being disposed adjacent one side of the subframe means adjacent one of the flanged wheels, a second taut cable and pulleys identical with the aforesaid cable and pulleys, additional pulleys on the mounting means, and each of said cables being anchored to the axle and being passed over the additional pulleys on the mounting means and connected with the other cable, and thereby assure continued downward pressure against both sides of the subframe and both of the flanged guide wheels while maintaining substantially constant pressure on the guide wheels under various load conditions.

5. In combination with a highway vehicle movable over rails of a railroad track that includes a longitudinally elongated body frame having a front and a rear frame portions, front wheels mounted on the front portion, a rear axle, spring means for dependingly mounting the rear axle on the rear frame portion to resiliently permit limited variations of the vertical spacing between the rear portion and axle, and flangeless rear wheels mounted on said axle, and a rear guide wheel assembly having transversely spaced left and right flanged guide wheels, a transversely elongated subframe, arm means for rotatably mounting the guide wheels, first means for mounting the arm means on the subframe for pivotal movement about a first transverse axis and resiliently urging the arm means to given angular positions relative the first axis, a transverse first pivot member, second means for mounting the first pivot member on the body frame portion rearwardly of the axle, said second means being mounted on the frame portion for movement therewith, third means mounted on the subframe for mounting the subframe for limited swinging movement about the central axis of the first pivot member, operable fourth means connected to the subframe for releasably locking the subframe in a rail travel position, and fifth means for mounting the fourth means on the second means, and transmitting a load through the fourth means to the subframe to maintain a nearly constant downward force on the guide wheels as the second means moves downwardly with the subframe in a rail travel position and the wheels on the rails.

16. The apparatus of claim 15 further characterized in that the second means comprises a pair of transversely spaced mounting members each having a vertical elongated slot remote from the axle, that the fourth means includes transverse shaft means extended through said slots that is vertically and angularly movable in said slots, an elongated first lock arm having a first end portion keyed to said shaft means and a second end portion, an elongated second lock arm having a first end portion connected to the first lock arm second end portion for pivotal movement relative thereto about a transverse axis and a second end portion, and means connecting the second lock arm second end portion to the subframe a substantial distance rearwardly of the first pivot member for pivotal movement relative the subframe about a transverse axis, and elongated arm sixth means having a first end portion mounting the shaft means for pivotal movement relative thereto about a transverse axis and a second end portion pivotally connected to the adjacent mounting member forwardly of said slots and at a higher elevation than the axle and the first pivot member.

17. The apparatus of claim 16 further characterized in that the first means includes a second transverse shaft freely rotatably mounted on the subframe, and a torsion spring on the second shaft that has one end fixedly secured to the shaft and a second end fixedly secured to the subframe, first mentioned arm means having one end portion fixedly secured to the second shaft to extend radially therefrom whereby the torsion spring resiliently urges the second shaft to position the first mentioned arm means at a given angular position relative the subframe.

18. The apparatus of claim 16 in that the fifth means includes seventh means for applying a downward force on the shaft means while permitting the mounting members moving downwardly when the third means is in a subframe locked, rail travel position and an increasing load is placed on the vehicle rear portion to maintain a nearly constant downward force on the guide wheels through the lock arms, subframe, arm means and first means.

19. The apparatus of claim 18 further characterized in that the seventh means includes a cable having a first end portion fixedly attached to the axle, an intermediate portion movably extended over the shaft means and a second end portion, said cable second end portion having a portion at least in part being mounted by at least one of mounting members rearwardly of the shaft means to be forced downwardly by the last mentioned mounting member as it moves downwardly relative the axle.

20. The apparatus of claim 15 further characterized in that the fifth means includes an elongated first arm having a first end portion pivotally mounted by the fourth means for pivotal movement relative the fourth means about a transverse second axis and a second end portion, and sixth means for mounting the arm second end portion on the second means for pivotal movement about a transverse third axis longitudinally intermediate the axle and the fourth means.

21. The apparatus of claim 20 further characterized in that the fourth means includes a transverse shaft pivotally connected to arm second end portion for pivotal movement about said second axis, said shaft being free to move generally vertically a limited amount relative said second means.

22. The apparatus of claim 20 further characterized in that the fourth means includes a transverse shaft pivotally connected to arm second end portion for pivotal movement about a transverse third axis longitudinally intermediate the axle and the fourth means.

23. The apparatus of claim 22 further characterized in that the fifth means includes a sheave mounted on said shaft, an elongated cable having a first portion rearwardly of said shaft that is mounted by the second means to move downwardly as the second means move downwardly, a second portion extended over the sixth means and the sheave in abutting relationship therewith and longitudinally movable relative thereto when the subframe is in a rail travel position, and a third portion fixedly attached to the axle, said second portion having one end joined to the third portion and an opposite end joined to the cable first portion, said sixth means being mounted on the mounting means at a higher elevation than the axle.

24. The apparatus of claim 23 further characterized in that the fourth means includes a first overcenter lock arm having one end keyed to the shaft and an opposite end, a second overcenter lock arm having one end connected to the first lock arm second end for pivotal movement relative thereto about an axis parallel to said second axis and a second end portion, and seventh means for pivotally connecting the second lock arm second end portion to the subframe at a location substantially more closely adjacent said first axis than the first pivot member.

25. The apparatus of claim 24 further characterized in that the second means comprises a pair of transversely spaced mounting members, at least one of said mounting members having a vertically elongated slot, said shaft having a first end portion extended through said slot, said slot being of a shape to permit the slotted mounting member moving relative the shaft in a downward direction.

26. The apparatus of claim 25 further characterized in that the shaft first end portion has a crank mounting portion, that said slotted mounting member has a second slot adjacent the first mentioned slot, that there is provided a lock plate mounted on the shaft intermediate the crank portion and the slotted mounting member, said lock plate being axially movable relative the shaft and angular fixed to the shaft, means for resiliently urging the lock plate into abutting engagement with the crank mounting portion, and a lock member fixedly attached to the first arm to move therewith and extended through said second slot, said lock member and lock plate having cooperating means for selectively locking the shaft in each of the subframe road travel position and rail travel position when the lock plate abuts against said crank mounting portion.

27. In combination with a highway vehicle having a longitudinally elongated body frame and flangeless front and rear wheels on the front and rear portions respectively of the body frame, a front and a rear guide wheel assembly mounted on the front and rear portions respectively of the body frame, at least one of said guide wheels assemblies including transversely spaced left and right flanged guide wheels, transversely spaced mounting members fixedly mounted on one of said body frame portions, a subframe having a first portion and a second portion longitudinally spaced therefrom, first means connected to the subframe first portion for mounting the subframe on the mounting members for movement between a rail travel position and a road travel position, second means mounted on the mounting members and connected to the subframe second portion for selectively moving the subframe between the road travel and rail travel positions and releasably locking the subframe in the selected subframe position, and third means mounted on the subframe second portion for mounting the flanged wheels for rotation about transverse axes in contact with railroad rails when the subframe is in its rail travel position, said second means including a transverse shaft pivotally mounted by the subframe second position, an elongated lock arm fixedly connected to the shaft to extend radially outwardly therefrom, fourth means mounted on the mounting members and connected to the lock arm for being operated by the lock arm moving about the axis of the shaft to move the lock arm and shaft to move the subframe between its positions as the shaft is pivoted and fifth means for selectively pivoting said shaft relative the subframe and selectively locking said shaft in selected angular positions relative the subframe.

28. The apparatus of claim 27 further characterized in that said lock arm and fourth means comprise an overcenter lock mechanism operable by pivotal movement by the shaft between a subframe overcenter locked, road travel position and an overcenter locked, rail travel position, and that fifth means includes a lock member mounted on the subframe, a crank member mounted on the shaft in a fixed angular position relative the shaft and axIally movement relative between a locking position abutting against the lock member to retain the shaft in the selected one of the subframe locked positions and an unlocked position relative the lock member.

29. The apparatus of claim 27 further characterized in that the fourth means includes a transverse second shaft pivotally mounted on the mounting members at a higher elevation than the subframe, an elongated second lock arm mounted in a fixed angular position on the second shaft, and pivot means for pivotally connecting the adjacent ends of the lock arms, said lock arms and pivot means comprising overcenter lock mechanism, and that the third means includeS arm means having one end portions rotatably mounting said guide wheels and second end portions and means for mounting the arm means on the subframe second portions and resiliently urging the subframe second end portions upwardly when the guide wheels contact the rails and the subframe is in the rail travel locked position.

30. In combination with a highway vehicle drivable over rails that has a longitudinally elongated body frame and flangeless wheels mounted on the front and rear portions respectively of the body frame, a front and a rear guide wheel assembly mounted on the front and rear portions respectively of the body frame, at least one of said guide wheel assemblies including transversely spaced mounting members mounted on one of said body portions, transversely spaced left and right flanged guide wheels, a subframe means, first means for mounting the guide wheels on the subframe means for movement therewith and rotatable movement relative thereto, second means mounted on the mounting members for mounting the subframe means for movement between an elevated guide wheel road travel position and a lowered rail travel position and operable third means mounted at least in part on the mounting members and connected to the subframe means for selectively releasably locking the subframe means in each of its positions, selectively moving the subframe means between its positions and cooperating with the first means for maintaining nearly a constant downward force on the guide wheels abutting against the rails in the lowered rail travel, locked position even with the vertical spacing of the mounting members from the rails varying limited amounts.

31. The apparatus of claim 30 further characterized in that the first means includes transverse shaft means rotatably mounted by the subframe means mounted on the shaft for mounting the guide wheels and resiliently urging the shaft means generally upwardly when the guide wheels are on the rails and the subframe means is in a locked, rail travel position.

32. The apparatus of claim 30 further characterized in that the third means includes fourth means mounted on the mounting members for limited vertical movement for moving the subframe means between its positions and releasably locking the subframe means in the selected one of its positions, and fifth means at least in part mounted by the mounting members for urging the fourth means to move downwardly in the lowered locked rail travel position of the subframe means with the guide wheels on the rails while permitting the mounting members moving downwardly relative the fourth means.

* * * * *